United States Patent Office 3,436,454
Patented Apr. 1, 1969

3,436,454
ANTIPYRETIC AND ANTIRHEUMATIC COMPOSITIONS CONTAINING AN ANIMAL MUCIN
Lucine Nouvel, 91 Ave. des Ternes, Paris 17°, France
No Drawing. Filed June 7, 1965, Ser. No. 462,095
Claims priority, application France, June 11, 1964, 977,900
Int. Cl. A61k 27/00, 15/12, 17/12
U.S. Cl. 424—10                         8 Claims This invention relates to improved medicament-containing compositions and more particularly to improved antipyretic and antirheumatic formulations which are substantially free of the harmful effects of many of such medicaments on the gastric wall, and possibly on the duodenal and pyloric walls.

Various of the known antipyretic and antiheumatic medicaments, e.g., aspirin, various salicylates, corticosteroids, phenyl butazone, ascorbic acid, or the like, exhibit toxic effects with respect to the stomach of the subjects treated. Prior efforts to obviate such effects have only provided satisfactory results with sodium salicylate which has been glutinized so as not to crumble in the stomach; however, such results is only effected with a concurrent delay in the action of the sodium salicylate medicament.

It is among the objects of the present invention to provide novel medicament-containing compositions which minimize, if not prevent, any harmful effects upon the gastric region of the medicaments contained therein, and without in any way attenuating the activity of such medicaments.

A further object of the invention is to provide such compositions containing known antipyretic, antirheumatic or other medicaments capable of exhibiting harmful actions with respect to mucuses.

Yet a further object of the invention is to provide a process for the formulation of such medicament-containing compositions, which facilitates more rapid and uniform absorption of the active medicaments by the subjects treated.

Other objects and advantages of the invention will be apparent from a consideration of the following detailed description of preferred embodiments of the compositions and processes hereof.

The medicament-containing composition of the present invention comprises an antipyretic or antirheumatic medicament which exhibits harmful effects on the gastric mucus, in admixture with a mucopolysaccharide in an amount sufficient to prevent attack by such medicament on the gastric mucus. More particularly, the toxic medicament is admixed with a mucopolysaccharide in the form of a mucin of animal origin, particularly ovine, porcine or bovine.

The mucin, in accordance with an important feature of the invention, contains a combined sialic acid (a neuraminic acid derivative, such as N-acetyl-, N-glycolyl-, or N,O-diacetyl-neuraminic acid), and constitutes a protective factor against the degradation of the gastric mucus by pancreatic endopeptidase.

The presence of combined sialic acid is believed to indicate that the mucopolysaccharide chains are intact, that is to say, have not undergone any degradation, and thus constitutes an important condition as regards the efficacy of the mucopolysaccharides in the medicament-containing compositions of the invention. This presence may be confirmed by one of the known analytic reactions described, for example, by Warren in The Journal of Biological Chemistry, vol. 234, No. 8, 1959, or by Svennerholm, "Quantitative Estimation of Sialic Acid," 1957. A very small content of sialic acid, e.g., of the order of 0.1% or even less, is sufficient to provide an active product but the best results are obtained with mucopolysaccharides which, in the dry state, contain from about 0.3 to 5% by weight of this acid.

It will, of course, be understood that the present invention is not restricted to any particular proposed mechanism that the reacon proposed above for the presence of combined sialic acid in the mucopolysaccharide additives of the present invention is intended as explanatory only, and not in a limiting sense.

The mucopolysacchardes incorporated in the medicament-containing compositions hereof are, as indicated above, used in the form of a mucin of animal origin. Preferably, those animal mucins which contain appreciable proportions of sialic acid, namely, the intestinal mucins or the glandular mucins, e.g., those originating from sub-lingual or sub-maxillary glands, or even viscera, are so utilized. However, it will be understood that the gastric mucin can also be used, preferably with the addition of other mucopolysaccharides containing combined sialic acid.

The mucopolysaccharide may be admixed with any of those medicaments specified hereinabove which exhibit harmful effects on the gastric mucus, e.g., acetylsalicylic acid, sodium salicylates, lithium salicylates, or hexamethylenetetramine, corticosteroids and/or phenol butazone, or the like. The mucopolysaccharide is admixed with such medicament in the proportion of from about 0.05 to 0.5 gram of the mucopolysaccharide for each dose of the medicament (the average dose of such medicaments may vary from about 0.1 mg. to 1 gram).

Preferably, from about 0.1 to 0.3 gram of the mucopolysaccharide, containing from about 0.001 to 0.005 gram of combined sialic acid, are admixed with each dose of the medicament. In the case of aspirin-containing compositions, from about 0.1 to 0.4 gram of animal mucin are suitably admixed with each 0.2 to 0.6 dose of the aspirin. In the case of vitamin C-containing compositions, good results have been achieved when animal mucins in the proportion of from about 0.05 to 0.3 grams, are admixed with each 0.2 to 0.6 gram dose of the active vitamin C.

Since the mucopolysaccharides are degraded in the stomach, the protection which results from the use thereof in the compositions provided in accordance with the invention only lasts as long as sufficient of the non-degraded product remains. One preferred embodiment of the invention facilitates avoiding such degration and actually effects stabilization of the mucopolysaccharides while in the gastric passage. Such stabilization is provided by incorporating aluminum hydroxide with the mucopolysaccharide in the medicament-containing compositions of the invention; unexpectedly, the aluminum hydroxide prevents absorption of the mucopolysaccharides by the acid medium of the stomach. Hence, while the mucin minimizes, if not prevents, toxic gastric reactions of the medicament, the aluminum hydroxide prevents degradation of the mucin by the acid gastric medium.

The proportions of aluminum hydroxide incorporated in the medicament-containing compositions of the invention may vary within wide limits, it being preferred, however, to at least use an amount equal in weight to the amount of the mucopolysaccharides incorporated in the composition; good results have been obtained when, for example, the aluminum hydroxide is incorporated in the composition in amounts of from about 1 to 10 times the weight of the mucin incorporated therein.

In accordance with a further feature of the present invention, a process is provided for formulating the compositions of the invention to facilitate their rapid and uniform absorption by the subject to be treated. In accordance with such process, the medicament-containing composition, which suitably may be in powder or other particulate, dry form, is wet with a small quantity of a solution of the mucin. The solution is employed in an amount such that the medicament remains dry yet becomes granulated, after being wet therewith. Tablets or dragees of medicaments thus coated with solutions of the mucin have been found to crumble in the stomach in a much more regular and progressive manner than those not so treated.

The solutions of mucin utilized in the manner described above may be formed in either aqueous or non-aqueous solvents. It has been found that non-aqueous solvents, particularly the alcohols, e.g., mono-alcohols, such as ethanol, di-alcohols, such as the glycols, or tri-alcohols, such as glycerin, are especially suitable for such use.

If necessary, the medicament-containing powders granulated as described above, may have added thereto a complementary quantity of mucin powder form and/or possibly other materials, after which conventional tabletting or other operations may be carried out.

The following examples illustrate the invention, without being intended as limiting thereof.

Example 1.—Aspirin-containing composition

Tablets of aspirin which are harmless to the stomach are prepared by tabletting the following ingredients: acetylsalicylic acid, 0.2 gram, with pig intestinal mucin with a high sialic acid content, 0.1 grams, and a sufficient quantity of a conventional excipient, e.g., potato flour 0.12, levilite 0.02, talcum 0.02.

A test sampling of 20 white rats was divided into two groups, each of about 20 animals of approximately 200 grams total weight. The animals of the first group received 20 mg. of aspirin every 24 hours, administered in two doses over a period of five days. The animals of the second group received 20 mg. of aspirin every 24 hours in the form of an aspirin-mucin mixture (corresponding to the formulation of this example) for the same period. All of the test animals were killed at the end of the treatment.

In the first group, all the animals showed ulcero-hemorrhagic lesions, the position of which was sub-cardial. As regards the animals of the second group, it was possible, with two of them, to isolate fine punctiform and very slightly hemorrhagic lesions. The other eight animals had absolutely clean gastric mucus.

The incorporation of the mucopolysaccharide in the aspirin-containing composition thus imparted, to the test rats, considerable protection with respect to the ulcer which is caused by acetylsalicyclic acid.

Example 2.—Aspirin-containing composition

A further aspirin formulation was compounded, in accordance with the invention, by tabletting:

| | Grams |
|---|---|
| Acetylsalicylic acid | 0.6 |
| Sub-maxillary bovine mucin | 0.24 |
| Excipient, q.s. | |

Examples 3 and 4.—Aspirin-containing compositions

Additional medicament-containing compositions were prepared containing differing proportions of aspirin and 0.1 grams of mucin, incorporating different quantities of combined sialic acid, according to the following formulae:

| | Example 3 (gram) | Example 4 (gram) |
|---|---|---|
| Acetylsalicylic acid | 0.25 | 0.50 |
| Sialic acid | 0.001 | 0.003 |
| Excipient | q.s. | q.s. |

Example 5.—Sodium salicylate-containing composition

A further formulation was prepared containing:

| | Gram |
|---|---|
| Sodium salicylate | 0.5 |
| Pig intestinal mucin | 0.25 |

Example 6.—Phenyl butazone-containing composition

A phenyl butazone-containing composition, which was not toxic to the gastric mucus, was prepared by tabletting:

| | Grams |
|---|---|
| Phenyl butazone | 0.1 |
| Vitamin C (ascorbic acid) | 0.1 |
| Sheep intestinal mucin | 0.2 |

When 0.4 gram of aluminum hydroxide was added to the composition, increased stability of the mucin with respect to gastric degradation was provided.

Example 7.—Vitamin C-containing composition

A further composition was prepared from the following:

| | Grams |
|---|---|
| Vitamin C | 0.5 |
| Beef sub-maxillary mucin | 0.3 |

Example 8.—Aspirin-containing composition

Other particularly stable medicament-containing formulations, which were capable of being administred over long periods, without any harmful gastric action, were prepared from the following ingredients, inthe specified proportions:

| | Grams |
|---|---|
| Aspirin | 0.1–0.6 |
| Mucin | 0.05–0.4 |
| Aluminum hydroxide | 0.05–0.4 |
| Excipient, q.s. (to make one tablet to be swallowed). | |

According to the present invention there are thus provided novel compositions and processes for minimizing, if not preventing, the harmful effects of various medicaments upon the gastric mucuses. Since various changes may be made in the preferred embodiments of the process and compositions hereof, without departing from the scope of the present invention, it will be understood that the preceding description should be construed as illustrative and not in a limiting sense.

What is claimed is:

1. A composition comprising a medicament selected from the group consisting of acetylsalicylic acid, an alkali metal salicylate, ascorbic acid, phenyl butazone and a corticosteroid, in admixture with an animal mucin selected from the group consisting of intestinal mucin and glandular mucin in an amount of from 0.05 to 0.5 g. of said mucin per dose of between 0.1 mg. to 1 g. of said medicament, the mucin containing from 0.3% to 5% by weight of sialic acid.

2. A composition comprising a medicament selected from the group consisting of acetylsalicylic acid, and alkali metal salicylate, ascorbic acid, phenyl butazone and a corticosteroid, in admixture with an animal mucin selected from the group consisting of glandular and intestinal mucin, in an amount of from 0.1 to 0.3 g. of said mucin per dose of between 0.1 mg. to 1 g. of said medicament, the mucin containing from 0.001 to 0.005 g. of combined sialic acid.

3. A composition according to claim 2, wherein the dose of medicament is between 0.2 g. and 0.6 g.

4. A composition comprising a medicament selected from the group consisting of acetylsalicylic acid, an alkali metal salicylate, ascorbic acid, phenyl butazone and a corticosteroid, in admixture with an animal mucin selected from the group consisting of glandular mucin and intestinal mucin in an amount of from 0.05 to 0.5 g. of said mucin per dose of between 0.1 mg. to 1 g. of said medicament, the mucin containing from 0.3% to 5% by weight of sialic acid and being stabilized by from 1 to 10 times its own weight of aluminum hydroxide.

5. A composition according to claim 4, wherein the dose of medicament is between 0.2 g. and 0.6 g.

6. A composition comprising aspirin in admixture with an animal mucin selected from the group consisting of glandular mucin and intestinal mucin, in the proportion of from 0.1 to 0.4 g., of the mucin per each 0.2 to 0.6 g. of the aspirin, said mucin incorporating from 0.3 to 5% by weight of combined sialic acid.

7. A composition comprising ascorbic acid in admixture with an animal mucin selected from the group consisting of glandular mucin and intestinal mucin, in the proportion of from 0.05 to 0.3 g. of the mucin per each 0.2 to 0.6 g. of the ascorbic acid, said mucin incorporating from 0.3 to 5% by weight of combined sialic acid.

8. A composition comprising a medicament selected from the group consisting of acetylsalicylic acid, an alkali metal salicylate, ascorbic acid, phenyl butazone, and a corticosteroid in admixture with an animal mucin selected from the group consisting of glandular mucin and intestinal mucin, said mucin containing at least 0.3% by weight of combined sialic acid.

References Cited

UNITED STATES PATENTS

| 2,095,259 | 10/1937 | Kober. |
| 2,472,476 | 6/1949 | Hardt. |
| 3,257,275 | 6/1966 | Weisberg. |

OTHER REFERENCES

Clinical Medicine, January 1956, p. 45.
Chem. Abstract 59, p. 1866e (1963).
Chem. AGS. 58, p. 6052g, 1962.

ALBERT T. MEYERS, *Primary Examiner.*

S. J. FRIEDMAN, *Assistant Examiner.*

U.S. Cl. X.R.

424—157, 180, 230, 232, 240, 273, 280, 319